Jan. 24, 1928.
S. D. RUTH
1,656,954
PORTABLE SILO
Filed April 16, 1927
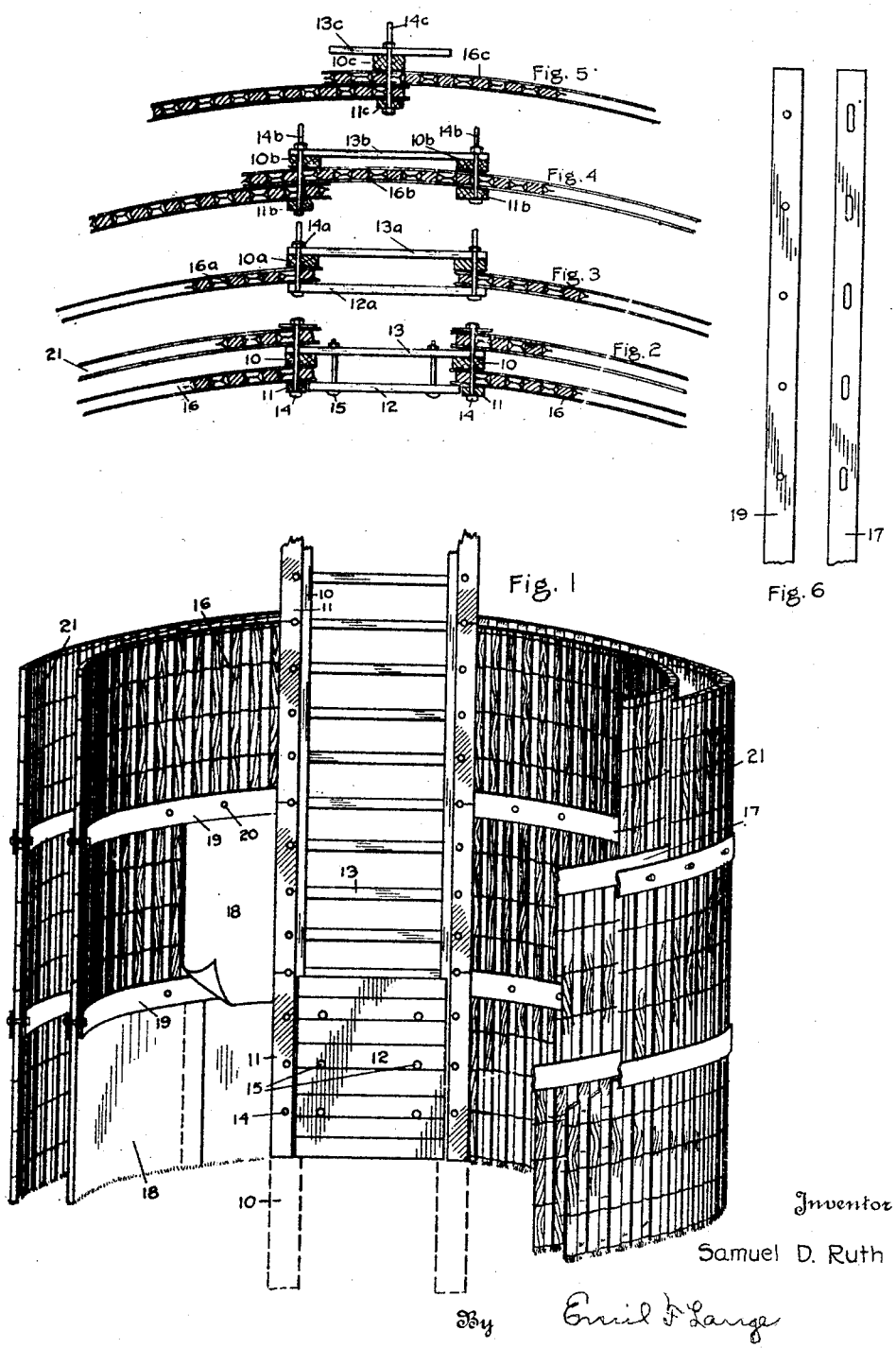
Inventor
Samuel D. Ruth
By Emil F Lange
Attorney Patented Jan. 24, 1928.

1,656,954

UNITED STATES PATENT OFFICE.

SAMUEL D. RUTH, OF BEATRICE, NEBRASKA, ASSIGNOR TO THE JOHN H. von STEEN COMPANY, OF BEATRICE, NEBRASKA, A CORPORATION OF NEBRASKA.

PORTABLE SILO.

Application filed April 16, 1927. Serial No. 184,339.

My invention relates to silos and its primary object is the provision of a portable or temporary silo construction. It is furthermore my object to provide a portable silo which may be folded into compact form and stored in a very small space when the silo is not in use. Another of my objects is the provision of a silo construction of very low cost and the provision of features whereby the silo may be erected or taken down with the minimum of labor, the silo walls being constructed of horizontal sections which may be added to when filling the silo and which may be removed one at a time when removing the contents of the silo.

Having in view these objects and others which will be pointed out in the following description, I will now refer to the drawings, in which Figure 1 is a view in perspective of a portion of the silo, the walls being broken away to give an interior view of the silo and the wall construction.

Figure 2 is a view in horizontal section of a portion of the silo showing one form of door which I may use in my silo construction.

Figure 3 is a similar view but showing a slight modification in the silo door.

Figure 4 is a view similar to Figures 2 and 3 but showing the door opening entirely closed by the silo wall.

Figure 5 is a view in horizontal section of the silo when the usual silo door is entirely dispensed with.

Figure 6 is a plan view of portions of the material of the inside and outside hoops which I use in the construction of the silo.

Any form of door suitable for a silo may be used with my silo. The door shown in Figures 1 and 2 includes two spaced posts 10 which are preferably anchored to the ground by sinking the lower ends in the soil or by securing them either permanently or removably to feet which are sunk in the soil. Secured to these posts on the inner sides of the silo are beams 11, the beams 11 being slightly narrower than the posts 10 to permit seating the door slats 12 between the edges of the beams 11 and against the posts 10. Secured to the posts 10 on their outer sides are steps 13 which constitute a ladder. The bolts 14 secure the beams 10 and the steps 13 rigidly to the posts 10. The door slats 12 may be secured in place by passing bolts 15 through the door slats and through the steps 13 as shown in Figure 2.

In carrying out my construction I employ fencing which is rigid in its vertical direction. I find that the fencing which is made by weaving vertical slats into horizontal strands of wire is admirably adapted for this purpose. Such fencing is available in a number of different widths, with slats of various thicknesses and with the slats variously spaced. The two strands of wire completely surround the slat and they are twisted into one or more turns between each pair of adjacent slats. Such fencing is moreover available in any desired length. The fencing which I prefer to use in my silo construction has not to exceed four twists in the wire strands between slats.

In carrying out my invention I cut the fencing into suitable lengths so as to give the desired diameter to the silo. In assembling the door I bring the ends of the fencing 16 against the posts 10 and then assemble the parts of the door in the usual manner. When the nuts on the bolts 14 are drawn tight the two ends of the fencing 16 will be tightly clamped between the beams 11 and the posts 10 so that there is no danger of slippage, and the fencing will be in more or less circular form, with its lower edge resting on the ground or on a suitable platform of wood, concrete or the like. The next section of fencing of equal length is then secured to the door in the same manner and with the ends of the slats resting on the top ends of the slats of the lower section. The construction may then be built up to any desired height.

The fencing alone would, of course, permit a portion of the silage to leak away and it would expose alomst the entire outer portion of the silage to the atmosphere. In order to avoid these difficulties I employ a suitable silo wall on the inner side of the fencing. For this purpose I have found that building paper and roofing paper are very effective at a very low cost. The material is relatively cheap, it is very flexible, it is a good insulator for heat and it is water proof. This material may, however, be varied as desired since it is evident that a water proof fabric or any one of numerous other sheet materials will satisfactorily perform the functions of protecting the silage from the atmosphere. The paper should be approximately the width of the fencing and it should be cut in sizes so that its vertical edges will overlap. The outward pressure of the silage is enormous, but when the slats are placed sufficiently close together the paper cannot be forced outwardly through the fencing between the slats. The pressure of the silage, however, causes an expansion of the fencing and with it an expansion of the paper. The vertical laps in the paper are designed for the purpose of permitting the paper walls to yield without being ruptured under the pressure of the silage. The chemical action in the silage combined with the heat of fermentation cements the paper at the laps so that the wall becomes a single air-tight unit.

The enormous pressure inside the silo necessitates the use of hoops on the outer side of the fencing between the sections of fencing. The sections are thus kept in vertical alignment by means of the hoops 17 and these hoops further reinforce and strengthen the fencing. To protect the paper wall 18 from being forced outwardly by the internal pressure between the sections of the fencing, there must be provided also internal hoops 19 at the joints in the fencing. In assembling the silo the top edge of the paper 18 rests directly against the fencing at the meeting edges of the joints between two sections of fencing, and the paper strip 18 is so hung that its lower edge will rest against the inner surface of the hoop 19. The hoops 17 and 19 are secured together against opposite sides of the fencing by means of bolts 20. In order to facilitate the assembling of the hoops and the fencing, one of the hoops, preferably the inner one 19, is formed with the usual bolt holes while the hoop 17 is formed with slots, since the fencing would be subject to slight variations, both in manufacture and in use, thus making it difficult to align apertures in two hoops unless provision were made similar to that shown in Figure 6.

Because of the simplicity of construction the silo may be erected at the time of filling the silo. Several units are first constructed in the manner already described and these are filled with silage. While this filling action is going on, additional units may be added and it is only necessary then to elevate the blower. The process is reversed when using the silage during the feeding season. When the level of the silage is below the level of the lower edge of the top unit, the top unit may be removed and rolled up for storage and additional units may be subsequently removed so that by the end of the season the entire silo may be stored away in a compact bundle and in a small space.

The construction as above described may be varied in numerous ways. Merely by way of illustration I have shown a number of modifications in Figures 3, 4, and 5, all employing the same basic ideas as above described. In Figure 3 the construction differs from that of Figure 2 only in the fact that the door slats 12$^a$ are bolted directly to the posts 10$^a$ and that a single set of bolts 14$^a$ holds the door slats 12$^a$, the steps 13$^a$ and the fencing 16$^a$ rigidly to the posts 10$^a$. The Figure 4 construction differs from the other two constructions in that the door slats are omitted altogether, the fencing 16$^b$ closing the doorway and being lapped at its ends against one of the posts 10$^b$. In this construction the fencing constitutes the door and the user enters the silo by climbing the steps 13$^b$ to the top section of fencing. This height will, of course, be reduced as the sections of fencing are removed from the top. The Figure 5 construction differs from all of the other constructions in that the doorway is entirely omitted and that a single post 10$^c$ is employed. Secured to the post 10$^c$ are cleats 13$^c$ which project laterally on both sides of the post to serve as steps. The fencing 16$^c$ is bolted with its edges lapped between the post 10$^c$ and the beam 11$^c$ by means of bolts 14$^c$ passing through the beam, the fencing, the post and the steps. These merely enumerate and describe some of the modifications of which my invention is susceptible.

In cold climates and in severe winter seasons it is desirable that the silo be protected against the freezing of its contents. For this purpose I provide an outer wall 21 of fencing having its ends bolted to the post 10 as shown in Figure 2. This wall is spaced from the inner wall and the space between the two walls may be filled with straw during the construction of the silo. If desired, the outer wall may be lined with paper but this is not necessary. Inner and outer hoops are sometimes desirable for holding the sections of fencing in vertical alignment, but when the diameter of the silo is not too great the hoops about the outer wall may be dispensed with, since the function of the outer wall is to hold the straw in position against the inner wall of the silo. The silo may be erected and filled but the erection of the frost proof wall may be deferred until the busy season on the farm is over but before severe freezing weather sets in. It should also be noted that the insulating material is a waste product of the farm and that it costs nothing but the labor cost at a season when the farmer's time is worth the least.

The portable silo as above described has numerous advantages over the prior silo constructions which are usually regarded as more or less permanent. The term "permanent" as applied to a silo is, however, a misnomer. The chemical action due to the fermentation of the silage, the bacterial action and the elements all combined tend to materially reduce the life of any silo construction regardless of whether it is built of wood, brick or concrete. My construction has the advantage over the so-called permanent silos in that it may be folded up and stored under shelter where it will not deteriorate under the action of the wind and rain. The great advantage of the portable silo is in the cost which is but a mere fraction of the cost of erecting any of the prior silos. For this reason it appeals to tenant farmers as well as to farmers who do not wish to use a fixed location for the silo. The portable silo is flexible in that it can be built to any desired height and in any desired diameter. The need for silage is governed by the feeding operations and these vary more or less from year to year. The condition of the crop in midsummer often determines whether or not it would be desirable to convert the crop into silage. With my portable silo it is only necessary to determine the requisite diameter needed for the feeding operations and the requisite height necessary for storing the available crop. Both of these factors vary from year to year and so far as I know my portable silo is the only silo which is flexible enough to be adapted to take care of all the varying needs.

Having thus described my invention in such such full, clear, and exact terms that its construction and operation will be readily understood by others skilled in the art to which it pertains, what I claim as new and desire to secure by Letters Patent of the United States is:

1. A curved silo wall of fencing, said fencing consisting of a plurality of rigid vertical slats in parallel and spaced apart relation and of horizontal strands of wire uniting said slats, and a layer of sheets of impervious material on the inner side of said fencing.

2. A curved silo wall of fencing, said fencing consisting of a plurality of rigid vertical slats in parallel and spaced apart relation and of horizontal strands of flexible wire uniting said slats, and a layer of sheets of impervious material on the inner side of said fencing, said sheets being overlapping at their lateral edges and being adapted to be cemented at the overlapping portion by the chemical action and heat and pressure of the silage during the curing of the silage.

3. A silo having a wall of superposed sections of fencing and a layer of sheets of impervious material on the inner side of said fencing, and a second wall surrounding said silo wall and spaced therefrom, the space between said two walls being adapted to receive a heat insulating material, said fencing including a plurality of members arranged in reticulated form.

4. A silo having a wall of superposed sections of fencing and a layer of sheets of impervious material on the inner side of said fencing, and bands of rigid material on the inner side of said fencing and overlapping the joints thereof, said sheets of flexible material having their upper edge portions clamped between said fencing and said bands of rigid material and being freely suspended therefrom, said fencing including a plurality of members arranged in reticulated form.

In testimony whereof I affix my signature.

SAMUEL D. RUTH.